(No Model.)
J. L. SWINK.
KITCHEN CABINET.
No. 525,750. Patented Sept. 11, 1894.
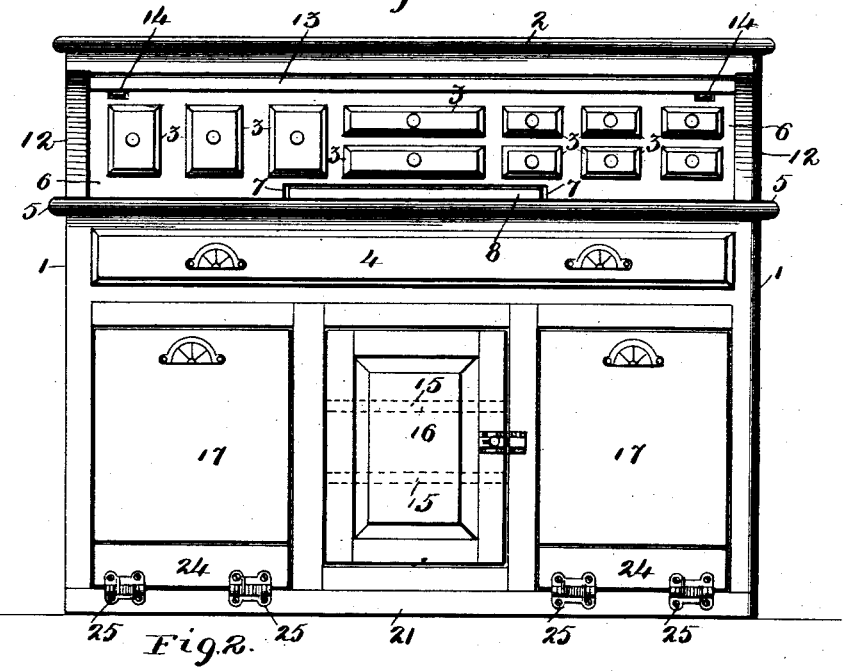
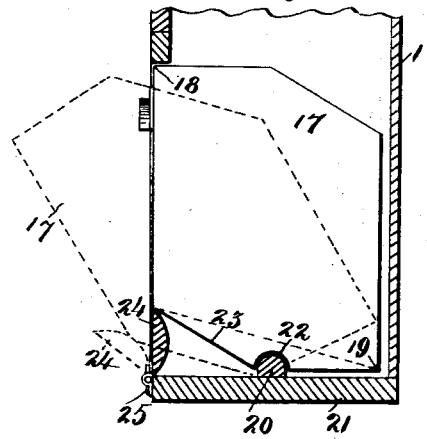
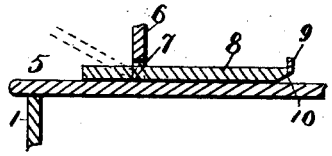
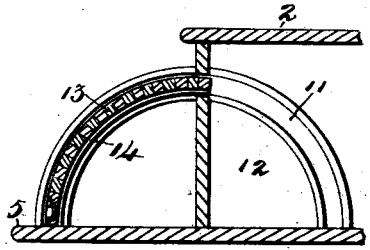
Witnesses:
J. J. O'Donohoe
Edw. Beckmann Jr.
Inventor:
John L. Swink.
By Keller & Stack
Attorneys.

UNITED STATES PATENT OFFICE.

JOHN L. SWINK, OF ST. LOUIS, MISSOURI.

KITCHEN-CABINET.

SPECIFICATION forming part of Letters Patent No. 525,750, dated September 11, 1894.

Application filed November 11, 1893. Serial No. 490,641. (No model.)

*To all whom it may concern:*

Be it known that I, JOHN L. SWINK, of the city of St. Louis, State of Missouri, have invented certain new and useful Improvements in Kitchen-Cabinets, of which the following is a full, clear, and exact description, reference being had to the accompanying drawings, forming a part hereof.

My invention has relation to improvements in kitchen cabinets and consists in the novel arrangement and combination of parts more fully set forth in the specification and pointed out in the claims.

In the drawings, Figure 1 is a front elevation of my improved cabinet. Fig. 2 is a sectional detail elevation of the flour bin of the same. Fig. 3 is a sectional detail of the kneading board; and Fig. 4 is a section showing the curved cover and groove within which the same slides.

The object of my invention is to construct a kitchen cabinet which will offer many points of advantage to the house-keeper, having among its constructive features a particular arrangement of flour bins, the arrangement of its several compartments and the location of the kneading board relative thereto, and other details to be hereinafter fully described.

Referring to the drawings, 1 represents a cabinet of any approved form, having the top 2. The cabinet is provided with a series of drawers 3 of various sizes for the reception of different seasoning materials, such as salt, peppers, seeds, &c. A drawer 4 of the full width of the cabinet is disposed immediately below the working surface or board 5 of the same. Within the front wall 6 along which the fronts of the various drawers 3 are disposed is an elongated opening 7 for the reception of a suitable kneading board 8 which in its normal position is slipped back into the body of the cabinet and below the series of drawers 3, but when in use, is withdrawn its full length up to and as far as its terminal projecting strip 9 will permit, the said strip 9 preventing the complete withdrawal of the board by coming in contact with the rear surface of the wall 6; but in case the board must be withdrawn for purposes of cleaning, the bevel edge 10 adjacent to the strip 9 permits the board to be tilted as shown in dotted lines in Fig. 3 sufficiently to admit the strip 9 to pass out of the opening 7.

A semicircular groove 11 along the opposite sides 12 of the cabinet receives a sliding cover 13 conforming to said groove and preferably made or built of a series of wooden strips as best shown in Fig. 4. The cover is guided and prevented from warping and binding by suitable guides 14 of metal as best shown in Figs. 1 and 4. When the device is not in use the cover 13 is closed over the kneading board 8 and series of drawers 3.

The lower portion of the device is composed of a central series of shelves 15 shown in dotted lines in Fig. 1 and closed by a suitable door 16. On either side thereof is a flour bin 17 the sides of which are preferably hexagonal in outline, two of the angles 18 and 19 being right angles so as to fit and conform to the front and rear walls of the cabinet when said bins are in a closed position. The bins swing on a transverse bearing rail 20 secured to the bottom 21 of the cabinet, said rail being preferably substantially semi-cylindrical in form and the bottom of the bin having a longitudinal groove 22 conforming thereto. A portion of the bottom of the bin between the rail 20 and the front of the cabinet inclines upward as shown at 23, full lines in Fig. 2, and when once tilted to any degree the bin is retained in said position by the strip 24 secured to the lower front edge of the bottom 21 by spring hinges 25. The inner surface of the strip 24 is convexly curved so as to freely co-operate with the bin, and follow up the same whatever be the position to which said bin may be tilted. Said strip 24 also assists the operator in closing the bin as it approaches its normal or closed position. The strip also prevents the access of mice, roaches and other insects to the cabinet and under the bottom of the bins.

Having described my invention, what I claim is—

1. A kitchen cabinet having a flour bin, a transverse bearing for the same, an upwardly inclined bottom extending from said bearing to the front of the bin, a hinged strip normally flush with the front of the bin, spring hinges for securing said strip, said strip having a suitable convexly curved inner surface to freely co-operate with said bottom and retain the bin in any of its tilted positions, substantially as set forth.

2. In a kitchen cabinet, side walls 12 having each a semicircular groove 11, a cover sliding in said grooves, and a metallic plate conforming to the curvature of the grooves at either end of said cover to prevent the same from binding, and acting as a guide for the same, substantially as set forth.

In testimony whereof I affix my signature in the presence of two witnesses.

JOHN L. SWINK.

Witnesses:
  JAMES J. O'DONOHOE,
  EMIL STAREK.